(12) United States Patent
Matsuzaka et al.

(10) Patent No.: US 8,644,613 B2
(45) Date of Patent: Feb. 4, 2014

(54) IMAGE SELECTION DEVICE AND IMAGE SELECTION METHOD

(75) Inventors: Kenji Matsuzaka, Nagano-ken (JP); Seiji Aiso, Nagano-ken (JP); Ayahiro Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1404 days.

(21) Appl. No.: 11/513,722

(22) Filed: Aug. 30, 2006

(65) Prior Publication Data

US 2007/0058869 A1 Mar. 15, 2007

(30) Foreign Application Priority Data

Aug. 31, 2005 (JP) ................. 2005-250436

(51) Int. Cl.
*G06K 9/46* (2006.01)
*G06K 15/00* (2006.01)

(52) U.S. Cl.
USPC .......... 382/190; 358/1.18; 358/538; 382/103; 382/286

(58) Field of Classification Search
USPC .......... 382/118, 190, 103, 286; 358/1.18, 538
See application file for complete search history.

(56) References Cited

U.S. PATENT DOCUMENTS

| | | | |
|---|---|---|---|
| 6,831,755 B1 | 12/2004 | Narushima et al. | |
| 7,272,267 B1 * | 9/2007 | Nakajima | 382/294 |
| 7,526,193 B2 * | 4/2009 | Minato et al. | 396/123 |
| 2003/0086134 A1 * | 5/2003 | Enomoto | 358/538 |
| 2003/0214662 A1 * | 11/2003 | Mochizuki et al. | 358/1.9 |
| 2004/0239983 A1 | 12/2004 | Shiota | |
| 2005/0094854 A1 * | 5/2005 | Kim | 382/118 |

FOREIGN PATENT DOCUMENTS

| | | |
|---|---|---|
| JP | 2000-259833 | 9/2000 |
| JP | 2002-010179 | 1/2002 |
| JP | 2002-358522 | 12/2002 |
| JP | 2004-304765 | 10/2004 |
| JP | 2004-361989 | 12/2004 |
| JP | 2005-020446 | 1/2005 |
| JP | 2005-39424 | 2/2005 |
| JP | 2005-49854 | 2/2005 |
| JP | 2005-056175 | 3/2005 |
| JP | 2005-086516 | 3/2005 |
| JP | 2005-148900 | 6/2005 |
| JP | 2005-165447 | 6/2005 |
| JP | 2005-196388 | 7/2005 |
| JP | 2005-210366 | 8/2005 |

OTHER PUBLICATIONS

Abstract of Japanese Patent Publication No. 2002-010179, Pub. Date: Jan. 11, 2002, Patent Abstracts of Japan.
Abstract of Japanese Patent Publication No. 2002-358522, Pub. Date: Dec. 13, 2002, Patent Abstracts of Japan.

* cited by examiner

*Primary Examiner* — Brian Q Le
*Assistant Examiner* — Michael Vanchy, Jr.
(74) *Attorney, Agent, or Firm* — Martine Penilla Group, LLP (57) ABSTRACT

When image data are input from a memory card or the like, a printing apparatus detects face region captured in these image data. Where the size and position of a face region fall within permitted ranges therefor set in advance in a permitted range table derived via sense evaluation testing, the input image data is selected as a printing target candidate. If the face region size and position do not each fall within their permitted range, however, the image data is not selected as a printing target. As a result, image data suitable for printing can be efficiently selected as printing targets from image data that contain human faces.

3 Claims, 7 Drawing Sheets

| | | ONE PERSON | | | TWO PERSONS | THREE OR MORE |
|---|---|---|---|---|---|---|
| | | LARGE PERSON | | CHILD | | |
| | | M | F | | | |
| POSTCARD 1/2 | PORTRAIT | | | | | |
| | LANDSCAPE | | | | | |
| L SIZE | PORTRAIT | FACE POSITION: 70%–10% OF IMAGE HEIGHT FROM EDGE OF IMAGE<br>FACE SIZE: 40%–5% OF IMAGE HEIGHT | | FACE POSITION: 50%–15% OF IMAGE HEIGHT FROM EDGE OF IMAGE<br>FACE SIZE: 90%–10% OF IMAGE HEIGHT | FACE POSITION: 70%–10% OF IMAGE HEIGHT FROM EDGE OF IMAGE<br>FACE SIZE: 30%–5% OF IMAGE HEIGHT | FACE POSITION: 80%–10% OF IMAGE HEIGHT FROM EDGE OF IMAGE<br>FACE SIZE: 30%–5% OF IMAGE HEIGHT (MAY VARY DEPENDING ON NUMBER OF PERSONS) |
| | LANDSCAPE | FACE POSITION: 60%–10% OF IMAGE HEIGHT FROM EDGE OF IMAGE<br>FACE SIZE: 60%–10% OF IMAGE HEIGHT | | FACE POSITION: 50%–15% OF IMAGE HEIGHT FROM EDGE OF IMAGE<br>FACE SIZE: 100%–20% OF IMAGE HEIGHT | FACE POSITION: 70%–10% OF IMAGE HEIGHT FROM EDGE OF IMAGE<br>FACE SIZE: 50%–10% OF IMAGE HEIGHT | FACE POSITION: 80%–10% OF IMAGE HEIGHT FROM EDGE OF IMAGE<br>FACE SIZE: AROUND 40%–6% OF IMAGE HEIGHT (MAY VARY DEPENDING ON NUMBER OF PERSONS) |
| POSTCARD SIZE | PORTRAIT | | | | | |
| | LANDSCAPE | | | | | |
| 2L | PORTRAIT | | | | | |
| | LANDSCAPE | | | | | |
| A4 | PORTRAIT | | | | | |
| | LANDSCAPE | | | | | |

TBL

IMAGE SELECTION DEVICE AND IMAGE SELECTION METHOD

CLAIM OF PRIORITY

The present application claims priority from Japanese application P2005-250436A filed on Aug. 31, 2005, the content of which is hereby incorporated by reference into this application.

BACKGROUND OF THE INVENTION

1. Field of the Invention

The present invention relates to a technology for selecting an output image candidate from among multiple input image data.

2. Description of the Related Art

Image data captured using a digital camera is normally recorded on a memory card installed in the digital camera. Because the image data captured by the digital camera can be easily deleted after it is captured, the user can take photos with little concern, and because modern memory cards have increased in capacity to the point where over 100 large image data can be recorded on a single memory card, the user can record an extremely large number of images on a memory card.

Where the image data recorded on a memory card is to be printed and distributed to others, it often occurs that an image on which a human face is captured is printed. In this case, the user must display the image data recorded on the memory card on the digital camera or on the display unit of a printing apparatus and select from among these image data the image(s) having the best color balance for the human face region. As the number of image data recorded on the memory card increases, this task of selection becomes increasingly burdensome.

Accordingly, in Japanese Patent Laid-Open No. 2002-10179, for example, a technology is disclosed in which following analysis of the image data, an image having the smallest amount of image shake is selected and recommended to the user as a printed image. In addition, in Japanese Patent Laid-Open No. 2002-358522, a technology in disclosed in which face regions are detected in the images and the user's selection of the best-looking image is aided by the display of enlargements of sections thereof that include face regions.

However, in the above Japanese Patent Laid-Open No. 2002-10179, while images having poor capture quality can be deleted, this cannot be done until the images having captured face regions are selected. Moreover, in Japanese Patent Laid-Open No. 2002-358522, with respect to images having a face region, because all images are displayed regardless of the size or position of the face, the user must identify images that will not look good when printed and are therefore unsuitable for selection, such as images in which the face region is extremely small.

SUMMARY

With the foregoing in view, the aspect of the present invention was devised in order to address at least one of these problems, and an object thereof is to enable the user to efficiently select as a printing target image an image data that, among multiple image data containing images of human faces, is suitable for printing.

With the above problem, an aspect of the present invention comprises an image selection device that selects an image data as an output image candidate from among multiple image data, including an input unit that inputs image data, a face detection unit that detects from these image data region in which human faces is captured, and an output target selector that, based on the specification of said detected face region and a predetermined selection standard, determines said input image data is to be selected as said output image candidate.

This image selection device detects face region in various input image data, and based on the specification of these detected face region and predetermined selection standards, determines the input image data is to be selected as an output image candidate. Therefore, an image data suitable for printing can be selected as an output image candidate from among the image data that include human faces, the efficiency of image selection by the user can be improved, and this image selection task can be made less burdensome for the user. Here, the face detection operation can be carried out using a public-domain face-detection technology.

In connection with the image selection device described above, it is acceptable if, where the size of the detected face region falls within a preset size range, the output target selector selects the input image data as an output image candidate.

Using this construction, the selection as an output image candidate of an image containing a face region that is unsuitable for printing, such as an image in which the captured face is excessively large or excessively small, can be prevented.

In connection with the image selection device described above, it is acceptable if, where the position of the detected face region in the image data falls within a preset position range, the output target selector selects the input image data as an output target candidate.

Using this construction, the selection as an output image candidate of an image containing a face whose position renders the image unsuitable for printing, such as an image whose captured face region is skewed to one edge, can be prevented.

In connection with the image selection device described above, it is acceptable if, when the size of the detected face region has a preset relationship to the position of the detected face region within the image data, the output target selector selects the input image data as an output target candidate.

Using this construction, an output target candidate can be selected based on the relationship between the size and the position of the detected face region in a two-dimensional space.

In connection with the image selection device described above, it is acceptable if, where the size of the detected face region falls within a preset size range and the position of the detected face region within the image data falls within a preset position range, the input image data is selected as an output target candidate.

Using this construction, an image data containing a face whose size and position render the image suitable for printing can be selected as a candidate for printing.

In connection with the image selection device described above, it is acceptable if the size range and position range are set in accordance with the characteristics of the face captured in the image data, the face detection unit further includes means to detect these face characteristics, and the output target selector carries out this selection by applying the above size range and position range in accordance with the detected face characteristics.

The characteristics of the faces captured in the image data may include one or more of such characteristics as the number of faces captured or the ages or genders of the persons whose faces are captured.

Using this construction, an output target candidate can be selected in accordance with the characteristics of the faces captured in the image data, such as the quantity, ages and genders of such faces.

In connection with the image selection device described above, it is acceptable if the size range and position range are set in accordance with the size and orientation of the printing paper on which the image data is to be output, the image selection device further includes means to identify the size and orientation of the printing paper on which an image selected as the output target is to be output, and the output target selector carries out such selection by applying the above size range and position range in accordance with the size and orientation of the determined printing paper.

Using this construction, an image suitable for printing can be selected in accordance with the size and orientation of the printing paper.

In connection with the image selection device described above, it is acceptable if the output target selector includes means that enable the user to adjust one or both of the size range and the position range.

Using this construction, an image that reflects the desires of the user can be selected.

In connection with the image selection device described above, it is acceptable if the size range and position range are sought statistically by displaying image groups comprising multiple photo subjects having different captured face sizes and positions and performing sense evaluation testing to select the preferred face sizes and positions.

Using this construction, an image data suitable for printing can be selected as an output target candidate based on the results of statistical evaluation.

It is acceptable if the image selection device described above includes means that stores a size range and position range for each user of the image selection device that outputs the image data.

Using this construction, an image data consistent with the wishes of the user seeking to output the image data can be selected.

In connection with the image selection device described above, it is acceptable if such image selection device includes means that seeks evaluation values for an input image data by evaluating such image data in accordance with the size and position of the detected face region, and the output target selector determines whether or not to select an input image data as an output target candidate based on the results of evaluation of the image data in accordance with the sizes of the evaluation values.

Using this construction, an image data suitable for printing can be selected based on the results of evaluation of the image data in accordance with the size and position of the captured face.

In connection with the image selection device described above, it is acceptable if the output target selector includes means to sort the image data in ascending order by evaluation values and select the candidate output targets in order beginning with the data having the highest evaluation values.

Using this construction, image data having higher evaluation values can be selected as printing targets.

It is acceptable if the image selection device described above includes a printing mechanism that prints images selected by the output target selector. Using this construction, the image selection device of the present invention can be applied as a printing apparatus.

The present invention may comprise not only the image selection device described above, but also an image selection method executed on a computer or a computer program. The computer program may be recorded on a flexible disk, CD-ROM, magnetic disk, memory card, hard disk or other recording medium.

DESCRIPTION OF THE PREFERRED EMBODIMENT

Figure 1:
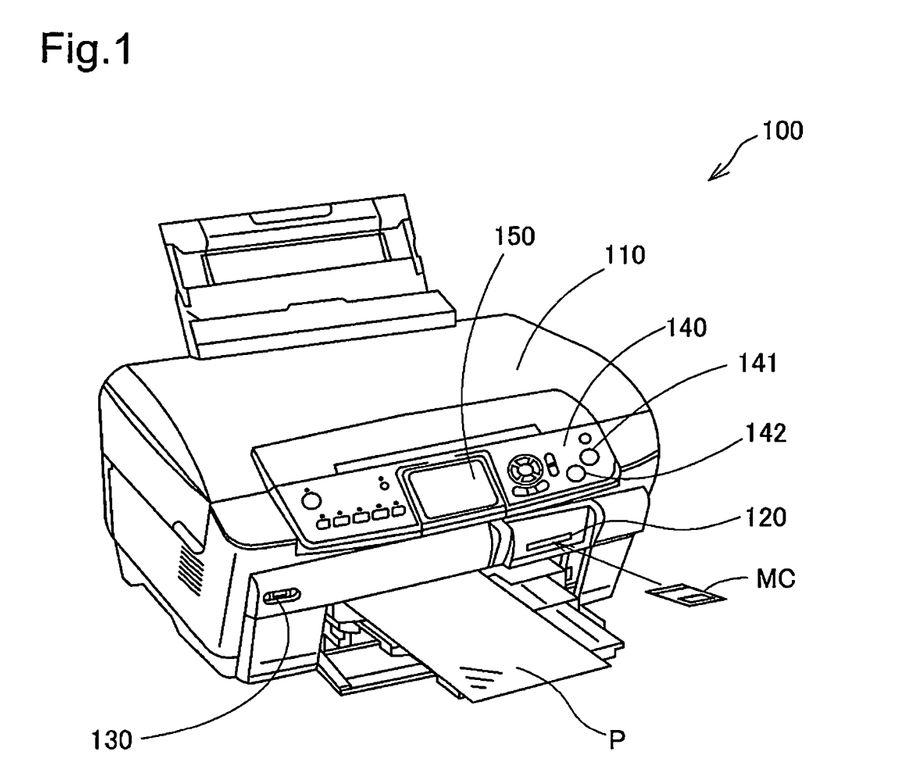
FIG. 1 is an external view of a printing apparatus 100 comprising an embodiment of the image selection device of the present invention.

In order to further clarify the operation and effect of the present invention described above, an embodiment of the present invention will be described below in the following sequence based on examples:
A. Basic construction of printing apparatus
B. Image selection process
C. Modifications A. Basic Construction of Printing Apparatus FIG. 1 is an external drawing of a printing apparatus 100 comprising an embodiment of the image selection device of the present invention. The printing apparatus 100 is a so-called multifunction-type printing apparatus, and includes such components as a scanner 110 that optically reads images, a memory card slot 120 in which a memory card MC on which image data is recorded is inserted, and a USB interface 130 that connects to peripheral equipment such as a digital camera. The printing apparatus 100 can print onto printing paper P images read via the scanner 110, images read from the memory card MC or images read from a digital camera via the USB interface 130. In addition, the printing apparatus 100 can print images input from a personal computer not shown that is connected via a printer cable or the like.

The printing apparatus 100 includes an operation panel 140 that enables the execution of various printing-related operations such as setting of the paper size or the number of printed copies. The operation panel 140 includes such buttons as an automatic selection button 141 that causes the printing apparatus 100 to automatically select images recommended for printing and a print button used to execute printing. A liquid crystal display 150 is disposed in the center of the operation panel 140. Images automatically selected by the printing apparatus 100 as images recommended for printing are displayed in the liquid crystal display 150.

Figure 2:
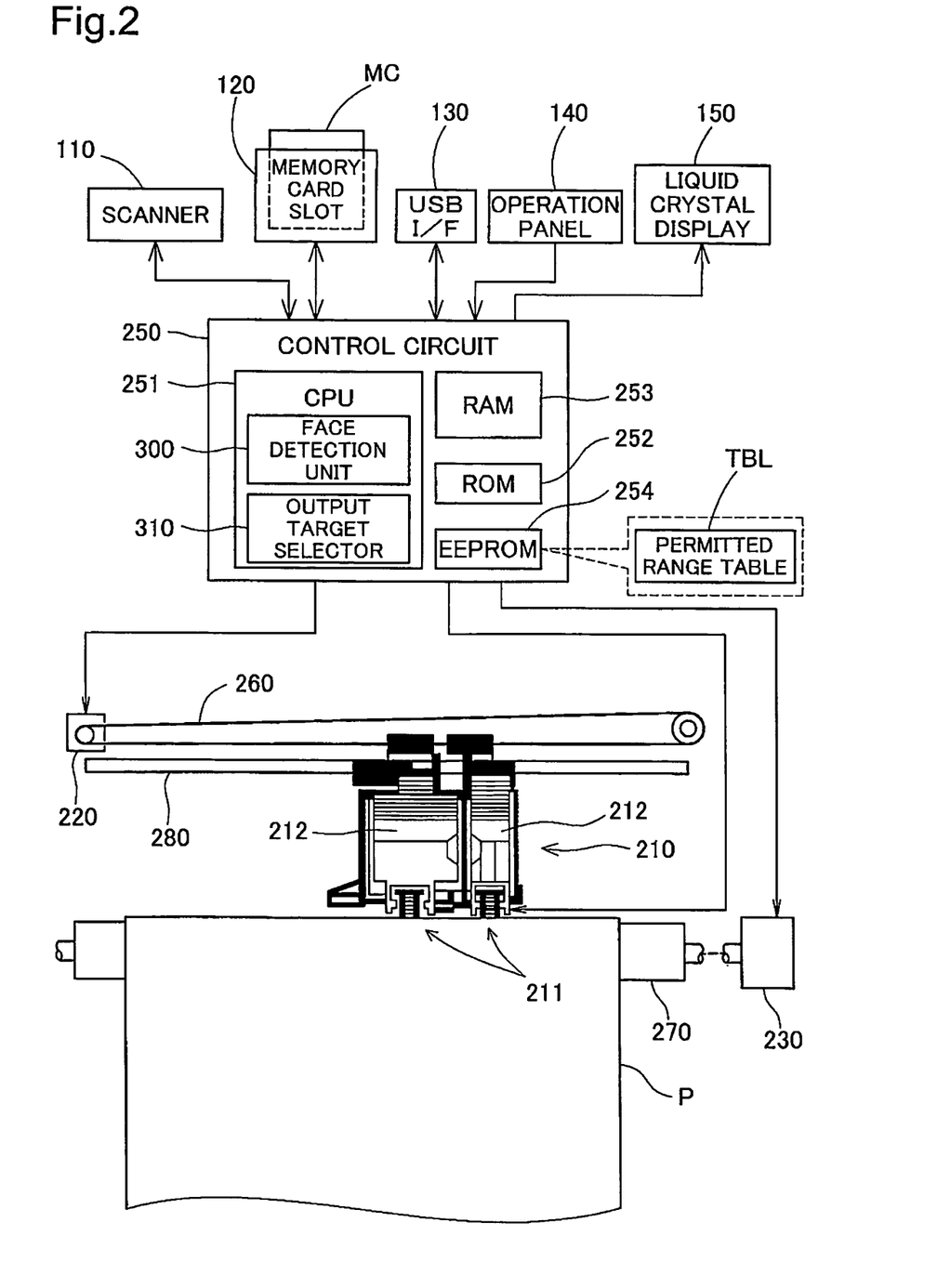
FIG. 2 is an explanatory drawing showing the internal construction of the printing apparatus 100.

FIG. 2 is an explanatory drawing showing the internal construction of the printing apparatus 100. As shown in the drawing, the printing apparatus 100 includes as mechanisms to execute printing onto the printing paper (P) a carriage 210 on which ink cartridges 212 are mounted, a carriage motor 220 that drives the carriage 210 in the main scanning direction, and a paper feed motor 230 that conveys the printing paper (P) in the secondary scanning direction.

The carriage 210 includes six ink heads 211, each of which expresses one of the colors of cyan (C), magenta (M), yellow (Y), black (K), light cyan (Lc) and light magenta (Lm). The ink cartridges 212 that house these inks are mounted to the carriage 210. The ink supplied to the ink heads 211 from the ink cartridges 212 is discharged onto the printing paper (P) via the driving of piezoelectric elements not shown.

The carriage 210 is movably secured to a motion shaft 280 disposed parallel to the axial direction of the platen 270 such that it can move along the motion shaft 280. The carriage motor 220 moves the carriage 210 parallel to the axial direction of the platen 270, i.e., in the main scanning direction, by causing the drive belt 260 to revolve according to commands from the control circuit 250.

The paper feed motor 240 conveys the printing paper (P) perpendicular to the axial direction of the platen 270 by causing the platen 270 to rotate according to commands from the control circuit 250. In other words, the paper feed motor 230 can move the carriage 210 in the secondary scanning direction relative to the printing paper (P).

The printing apparatus 100 includes a control circuit 250 that controls the operation of the above ink heads 211, carriage motor 220 and paper feed motor 230. The scanner 110, memory card slot 120, USB interface 130, operation panel 140 and liquid crystal display shown in FIG. 1 are all connected to the control circuit 250.

The control circuit 250 comprises a CPU 251, ROM 252, RAM 253 and EEPROM 254. A control program that executes overall control of the operations of the printing apparatus 100 is stored in the ROM 252. Information set using the operation panel 140, such as the printing paper size or the number of copies to be printed, as well as image data read from the memory card MC or the like, is stored temporarily in the RAM 253. The permitted range table TBL described above (see FIG. 3) is stored in the EEPROM 254.

The CPU 251 functions as the face detection unit 300 and output target selector 310 shown in FIG. 2 by calling and executing in the RAM 253 the control program stored in the ROM 252.

The face detection unit 300 detects the characteristics of face regions included in the image data, i.e., the size and position of the faces, by analyzing the image data input via the memory card MC or the like. Face regions are detected by extracting those regions in the image data that contain skin-colored pixels and carrying out pattern-matching by comparing these regions to a predetermined template that expresses the configuration of a face. Face region detection may alternatively be performed using various publicly-disclosed technologies (see, for example, Japanese Patent Laid-Open No. 2005-141584).

Furthermore, the face detection unit 300 estimates the characteristics of captured faces, i.e., the number of faces and the ages and genders thereof, based on the contours of detected face regions, the number of detected contours, and the positions of organs, such as the eyes and nose, included in a given region. The estimation of age and gender may also be carried out using any of various publicly-disclosed technologies (see, for example, Japanese Patent Laid-Open No. 2005-165774 or Japanese Patent Laid-Open No. 2005-148880).

The output target selector 310 compares the size, position, quantity, age and gender of a face region detected by the face detection unit 300 with the permitted range table TBL recorded in the EEPROM 254, and thereby determines whether or not to select the input image data as a printing target candidate.

Figure 3:
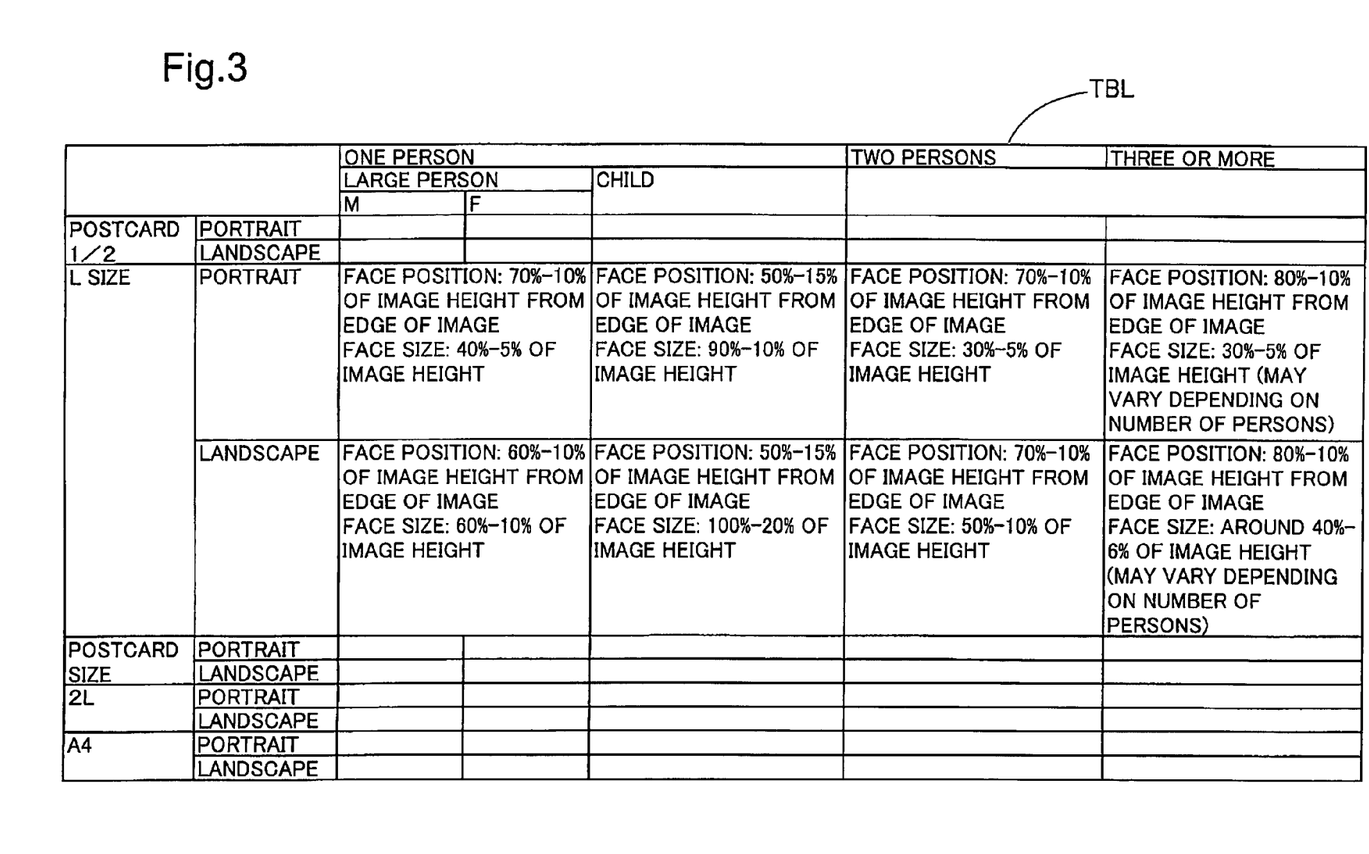
FIG. 3 is an explanatory drawing showing an example of a permitted range table TBL.

FIG. 3 is an explanatory drawing showing an example of the permitted range table TBL. As shown in the drawing, the permitted range table TBL defines the standards for selecting an image data to be selected as a printing target in accordance with the number of persons captured in the image data (i.e., the quantity of faces), the age(s) (divided into the two categories of 'adult' and 'child' in this embodiment) and gender(s) of such face(s), and the size and orientation of the printing paper. These selection standards define the permitted ranges for face position(s) and face size(s).

Figure 4A:
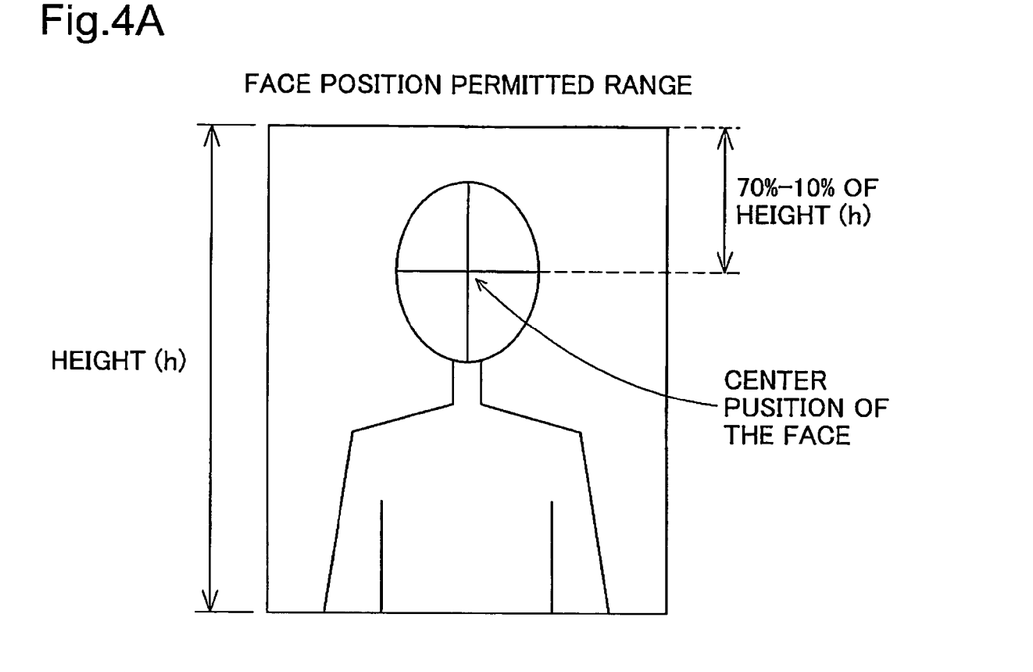
FIGS. 4A and 4B are explanatory drawings showing in a visual fashion the permitted ranges for the face position and size, respectively.
Figure 4B:
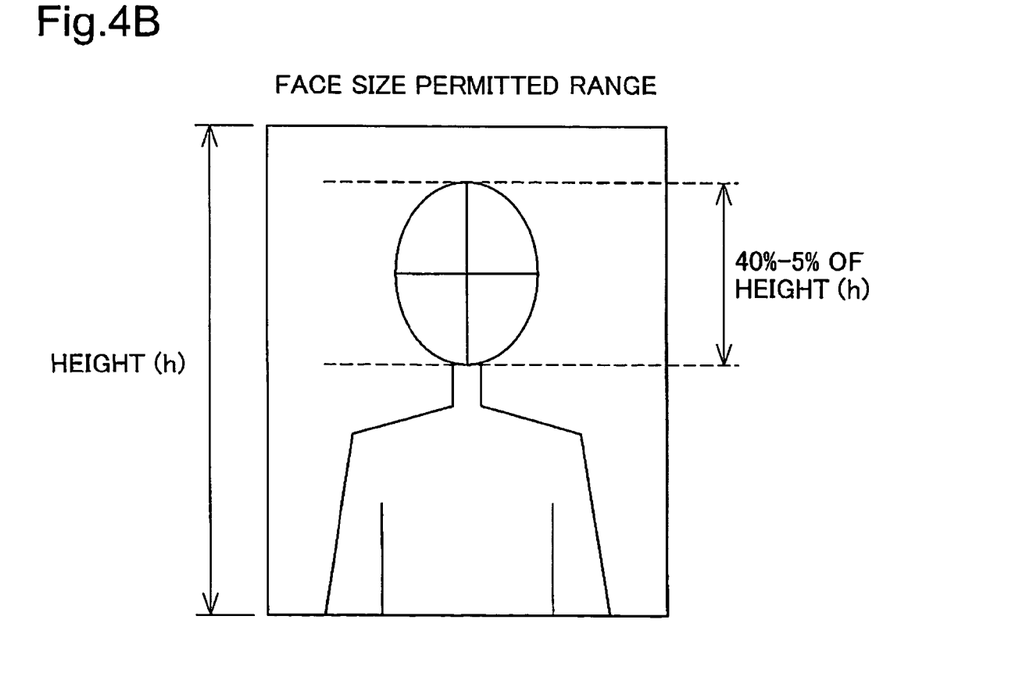

FIGS. 4A and 4B are explanatory drawings showing in a visual fashion the permitted ranges for the face positions and sizes defined in the permitted range table TBL. The drawings show the face position permitted range (FIG. 4A) and face size permitted range (FIG. 4B) in the case where the captured face is that of a single male adult and the printing paper is L-sized paper in portrait orientation (see FIG. 3). In other words, FIG. 4A indicates that the face position permitted range varies from 70% to 10% of the image height (h) from the top edge of the image, while FIG. 4B indicates that the face size permitted range varies from 40% to 5% of the image height (h). The 'face position' refers to the position of the center of the face.

The permitted range table TBL is created through sense evaluation testing that seeks the face size and position that the typical person feels are most suitable for printing. In other words, image groups in which various sizes of faces were placed at various positions in the image were prepared and classified by the quantity, ages and genders of subjects and the printing paper, and the images felt to be most appropriate were selected by the test subjects. As a result, the permitted ranges for the preferred face sizes and positions are defined in the permitted range table TBL.

In addition to the settings for the permitted range table TBL derived from sense evaluation testing, (A) if the photo subject is a baby, it is preferred that the face be relatively large so that its facial expression may be seen, (B) if the photo is a vertically long photo, it is preferred that the photo be a waist shot or full-body photo rather than a close-up on the face, and (C) if multiple persons are captured in the photo, the permissible range for the face sizes becomes smaller. In addition, in the case If L-sized portrait orientation printing paper, for example, an exclusion range may be set such that the image is excluded from consideration if the face is positioned at a distance equal to 70% or more of the image height from the top edge of the image, and the face size is less then 5% of the image height.

B. Image Selection Processing

Figure 5:
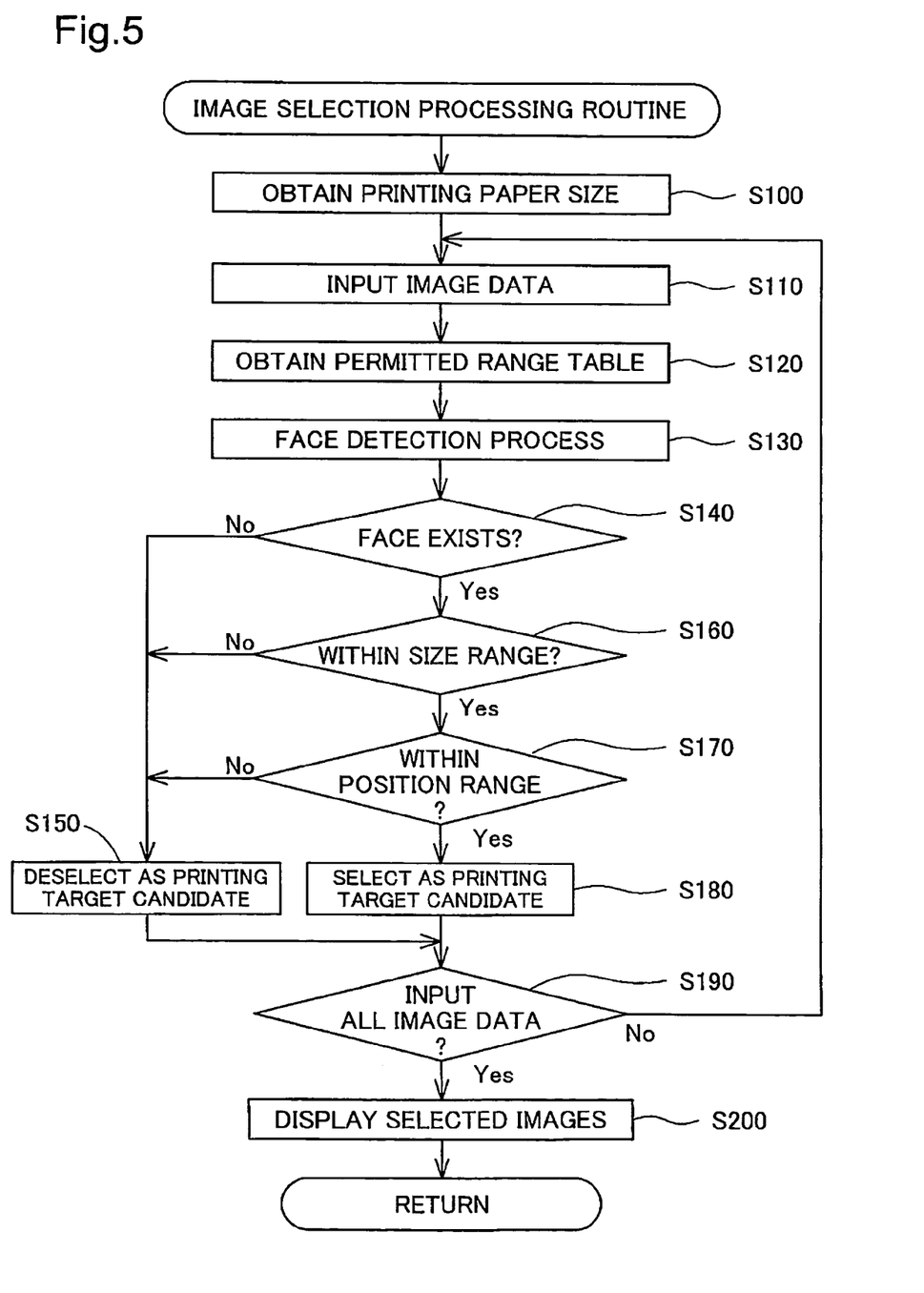
FIG. 5 is a flow chart of an image selection processing routine.

FIG. 5 is a flow chart of an image selection processing routine executed by the CPU 251 when the automatic selection button 141 on the operation panel 140 is pressed. Here, the situation where images recommended for printing are recommended from among the image data recorded on the memory card MC. The image data input source here may be a digital camera connected via the USB interface 130 or a personal computer.

When this image selection processing routine is executed, first, the CPU 251 obtains the printing paper size information set by the user via the operation panel 140 from the RAM 253 (step S100). This size information includes information indicating the size of the printing paper (such as postcard, L size, A4 size or the like) and information indicating the printing paper orientation (such as portrait or landscape).

After the printing paper size information is obtained, the CPU 251 inputs one image data from the memory card MC (step S110). Where a folder from which the image data is to be read is specified by the user, the image data is input from that folder on the memory card MC.

After the image data is input, the CPU 251 obtains the permitted range table TBL recorded in the EEPROM 254 (step S120).

Next, the CPU 251 detects, via the operation of the face detection unit 300, the size, position, number, age and gender of the face captured in the image data (step S130). When this is done, if the detected face size does not match any of the permitted ranges in the permitted range table TBL obtained in step S120, detection of the face position, number, age and gender may be omitted. In such a case, the image data would not be selected as a printing target in steps S150 and S160 (described below) regardless of the face position, quantity, age or gender, so omitting such detection here serves to improve the speed of processing.

Where face detection is carried out by the digital camera that captured the image data and information regarding face size, position and the like is recorded in the image data as additional information, this information may be obtained from the image data in step S130 above.

When the face detection processing of step S130 is completed, the CPU 251 determines whether or not to select the input image data as a printing target candidate by carrying out the processing described below (steps S140-S180) via the operation of the output target selector 310.

In other words, first, the CPU 251 determines whether or not a face is detected in the input image data (step S140). If no face is detected in the image data as a result of this determination (NO in step S140), the CPU 251 does not select the input image data as a printing target (step S150). In this way, an image data in which a human face is not captured can be excluded from consideration as a printing target.

If it is determined that at lease one of faces was detected during face detection, on the other hand (YES in step S140), the CPU 251 determines whether or not the size(s) of the detected face(s) fall within the applicable face size permitted range set in the permitted range table TBL (step S160). Specifically, the face size(s) used for comparison are obtained from the permitted range table TBL in accordance with the quantity, ages and genders detected in step S130 and the printing paper size information obtained in step S100. The above determination is then carried out by comparing these permitted ranges with the face size(s) detected in step S130. For example, according to the permitted range table TBL shown in FIG. 3, if the face detected during the face detection process is that of a single male adult, and the printing paper size is L size, the face size permitted range is 5%-40% of the image height and this permitted range is compared with the detected face size.

If the determination in step S160 results in a determination that the detected face size falls outside the face size permitted range set forth in the permitted range table TBL (NO in step S160), the CPU 251 determines that the input image data is not suitable for printing and does not selected such item as a printing target (step S150).

If the detected face size does fall within the permitted range set forth in the permitted range table TBL, on the other hand (YES in step S160), the CPU 251 determines whether or not the detected face position falls within the face position permitted range established in the face position permitted range (step S170). Specifically, the permitted range for the position of the face to be compared with the permitted range table TBL is obtained according to the quantity, age and gender detected in step S130 and the printing paper size information obtained in step S100. The above determination is then carried out by comparing this permitted range with the face position detected in step S130. For example, according to the permitted range table TBL, if the face detected during the face detection process was that of a single male adult and the printing paper size is L size, the position range for that face is '70%-10% of the image height from top edge of image', and this permitted range is compared with the detected face position. In this embodiment, this position is expressed as the distance from the top of the image to the position of the center of the face as a percentage of the image height. However, the eye position may be used as the face position by detecting the position of the eyes during the face detection process.

If it is determined in step S170 that the detected face position does not fall within the face position permitted range established in the permitted range table TBL (NO in step S170), the CPU 251 determines that the input image data is not suitable for printing and does not selected it as a printing target (step S150).

If the detected face position does fall within the face position permitted range established in the permitted range table TBL, however (YES in step S170), the CPU 251 determines that the input image data is suitable for printing and selects it as a printing target candidate (step S180).

After the CPU 251 determines in steps S150 and S180 whether or not the input image data is to be selected as a printing target candidate, the CPU 251 determines whether or not the input of all image data has been completed (step S190). If all image data has been input (YES in step S190), the image data selected as printing target candidates are displayed on the liquid crystal display 150 (step S200), and the series of automatic selection processing routines is completed. If input of all image data has not been completed, on the other hand (NO in step S190), the CPU 251 returns to the process of step S110, another image data is input, and it is determined whether this image data is to be selected as a printing target candidate.

After the images displayed on the liquid crystal display 150 in step S200 are confirmed, the user can print the images selected as printing target candidates by pressing the print button 142 on the operation panel 140. It is acceptable if only images selected in the image selection processing routine described above, for example, are displayed on the liquid crystal display 150. Furthermore, when all images input via the memory card MC are displayed and images selected in the image selection processing routine are displayed together therewith, it is acceptable if an image to be printed is indicated by '1' and non-selected image is indicated by '0'. The non-selected image may be differentiated from the selected image via the method of display, such as by graying out the non-selected image, for example. After the image displayed on the liquid crystal display is confirmed, the user can one more select whether or not that image is to be printed.

According to the printing apparatus 100 of the embodiment described above, among all images containing a human face, those images that are suitable for printing can be selected automatically with reference to the permitted range table TBL based on their characteristics, such as the size and position of the face captured in the image. Consequently, even if a large amount of image data is recorded on the memory card MC, the efficiency of the image selection process by the user can be improved and the selection task can be made less burdensome.

C. Variations

While an embodiment of the present invention was described above, the present invention is not limited thereto, and various constructions thereof may be adopted within the essential scope thereof For example, the functions realized via software may be realized via hardware. In addition, the variations described below may be implemented.

C-1. Modification 1

In the above embodiment, image selection is carried out based on whether the size and position of the face detected from the image data fall within permitted ranges established within the permitted range table TBL. Alternatively, however, it is acceptable if an image evaluation value is sought based on the size and position of the detected face using the evaluation method shown in FIG. 6 or the two-dimensional map shown in FIG. 7, and images having a high evaluation value are selected as printing target candidates.

Figure 6:
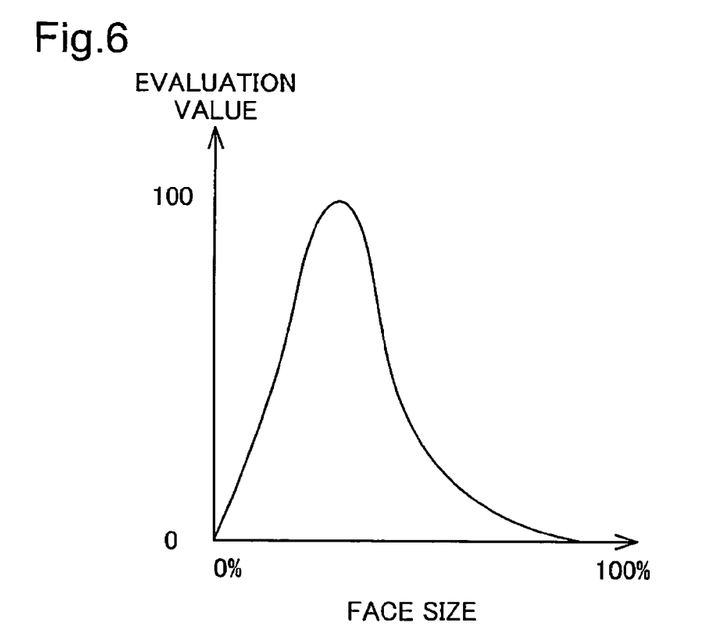
FIG. 6 is an explanatory drawing showing a graphical representation of an evaluation method used to seek an evaluation value in accordance with face size.

FIG. 6 is an explanatory drawing showing a graphical representation of an evaluation formula used to seek an evaluation value based on face size. According to this evaluation formula, the evaluation value of an image may be sought in accordance with the face size detected during the face detection process. This evaluation formula is stored in the EEPROM 254 or the ROM 252 and takes into account each of the following characteristics: the number of persons captured in the image, their ages and genders, and the paper size and orientation. This evaluation formula is defined in advance via sense evaluation testing, as in the case of the permitted range table TBL.

Figure 7:
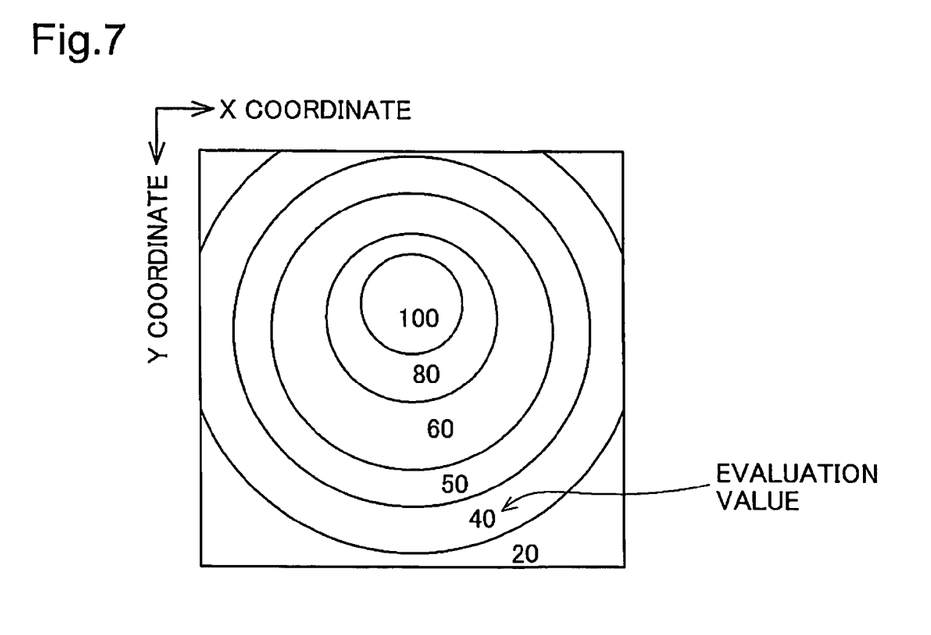
FIG. 7 is an explanatory drawing showing an example of a two-dimensional map used to seek an evaluation value in accordance with face position.

FIG. 7 is an explanatory drawing showing an example of a two-dimensional map used to seek an evaluation value in accordance with face position. According to this two-dimensional map method, the evaluation value of an image may be sought based on the coordinate position of the position of the face detected during the face detection process on the two-dimensional map. This two-dimensional map, like the above evaluation formula, is stored in the EEPROM 254 or the ROM 252 and takes into account the same characteristics, i.e., the number of persons captured in the image, their ages and genders, and the paper size and orientation. In addition, like the permitted range table TBL, this two-dimensional map may be defined in advance via sense evaluation testing.

Using the printing apparatus 100, when the evaluation value for face size and the evaluation value for face position are sought via the evaluation formula and the two-dimensional map described above, images whose evaluation values exceed predetermined threshold values may be selected as printing target candidates. In addition, it is acceptable if all input images are sorted in ascending order based on each image's evaluation values and a preset number of images are selected in ascending order based on these evaluation values. In this case, images whose evaluation values do not exceed the predetermined threshold values may be excluded as printing targets even if they are included in the preset number of images. Furthermore, when sorting all images in ascending order based on evaluation values, it is acceptable if they are first displayed on the liquid crystal display 150 and subsequent selection is performed by the user himself.

According to the variation described above, images suitable for printing can be selected by evaluating the input images using an evaluation formula and a two-dimensional map.

C-2. Modification 2

In the above embodiment, it is determined whether or not an image is to be selected as a printing target based on the size and position of the face(s) detected in the image data. Conversely, however, it is acceptable if, for example, prior to determination based on face size and position, it is determined whether or not an input image data is out of focus, exhibits hand shake, or is improperly exposed. In this case, if the input image data exhibits any of these problems, it can be excluded from consideration as a printing target candidate before face detection is performed. This enables images that are clearly not suitable for printing to be excluded as printing target candidates in advance, prior to execution of the face detection process.

C3. Modification 3

In the above embodiment, the permitted range table TBL was sought in advance via sense evaluation testing and recorded in the EEPROM 254, but the permitted range table TBL may alternatively be customized according to the preferences of the user by performing predetermined operations on the operation panel 140. This enables images that reflect the user's preferences to be selected.

A separate customized permitted range table TBL may be recorded in the EEPROM 254 for each user who performs such customization. In this case, in the printing apparatus 100, before the above image selection processing routine is performed, a list of users is displayed on the liquid crystal display 150 and the user who is to perform printing is selected The permitted range table TBL for the user selected via this user interface is then obtained from the EEPROM 254, enabling the user to select his desired images.

C-4. Modification 4

Figure 8:
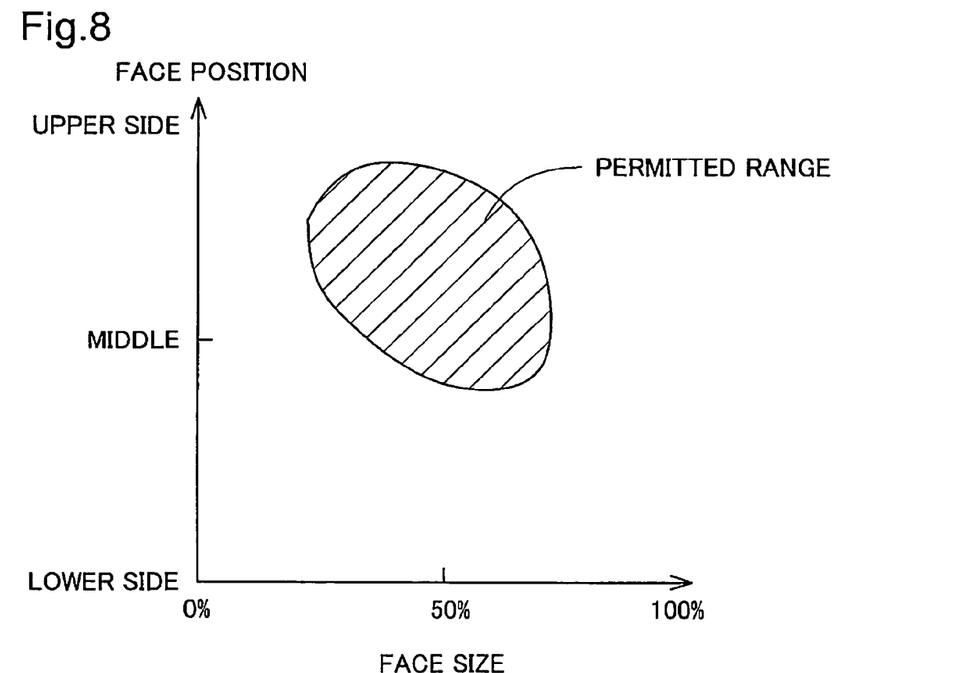
FIG. 8 is an explanatory drawing showing an example of a two-dimensional map that defines the relationships among the face position, the face size and the permitted ranges therefor.

In the above embodiment, the permitted ranges for face position and face size are set separately, but it is alternatively acceptable of a two-dimensional map that defines the relationship between the face position, the face size and the permitted ranges thereof at one time is defined in the permitted range table TBL, as shown in FIG. 8.

FIG. 8 is an explanatory drawing showing an example of a two-dimensional map that defines the relationships among the face position, the face size and the permitted ranges therefor. The horizontal axis in the drawing indicates face size, while the vertical axis indicates face position. The area in the graph indicated by hatch marks indicates the permitted range. According to this two-dimensional map, it can be easily identified whether or not a detected face is included in the permitted ranges based on the face's position on the map, which is fixed by the size and position of the face detected during the face detection process.

C-5. Modification 5

Figure 9:
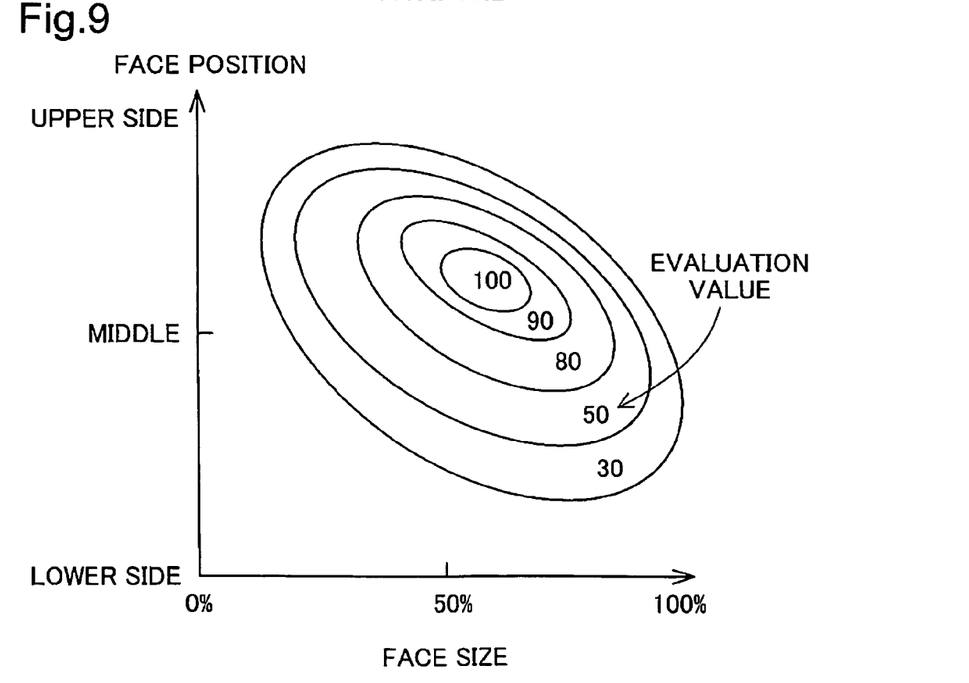
FIG. 9 is an explanatory drawing showing an example of a two-dimensional map that defines the relationships among the face position, the face size and the evaluation values therefor.

In the Variation 4, the relationships among the face position, the face size and the permitted ranges therefor are defined by a two-dimensional map, but the relationships among the face position, the face size and the evaluation values therefor as described in connection with the Variation 1 may also be defined using a two-dimensional map.

FIG. 9 is an explanatory drawing showing the relationships among the face position, the face size and evaluation values therefor. The horizontal axis in the drawing indicates face size, while the vertical axis indicates face position. An evaluation value is allocated to the region enclosed by each of the several concentric circles in the drawing. According to this two-dimensional map, an evaluation value for a detected face can be easily sought based on the face's position on the map, which is fixed by the size and position of the face detected during the face detection process.

C6. Modification 6

In the above embodiment, the printing apparatus 100 automatically selects images recommended for printing. However, it is acceptable if a personal computer reads the image data from the memory card MC and executes the image selection processing routine shown in FIG. 5. In this way, images recommended for printing can be automatically selected by a personal computer. Alternatively, it is acceptable if images recommended for printing are automatically selected in the manner described above by a digital camera that captures images, an image viewing device that enables the viewing of images or a similar device, instead of by a personal computer.

What is claimed is:

1. An image selection method that selects an output target candidate among multiple image data, comprising the steps of:
   (a) receiving input image data;
   (b) detecting a region in which a human face is captured from said input image data, and detecting face characteristics of the detected face region;
   (c) determining, based on the specification of said detected face region and a predetermined selection standard, said input image data is to be selected as said output image candidate; and
   (d) identifying a size and orientation of printing paper on which an image selected as said output target is to be output,
   wherein said input image data is selected, the size of said detected face region in which falls within a preset size range and the position of said detected face region in which falls within a preset position range, as an output target candidate at said step (c),
   wherein said size range and position range are set in accordance with the characteristics of the face captured in said image data and in accordance with said size and orientation of the printing paper on which said image data is to be output,
   wherein said step (c) carries out said selection by applying said size range and said position range in accordance with said detected face characteristics, and by applying said size range and said position range in accordance with said size and orientation of the determined printing paper,
   wherein the characteristics of the faces captured in said image data include at least one of such characteristics as a number of faces captured, ages of the persons whose faces are captured, or genders of the persons whose faces are captured,
   wherein said size range and said position range are sought statistically by displaying image groups comprising multiple photo subjects having different captured face sizes and positions and performing sense evaluation testing to select the preferred face sizes and positions, the sense evaluation testing including having test subjects select images with the face sizes and positions that the test subjects consider to be most appropriate for printing and creating a permittable range table defining the permittable ranges for the face sizes and positions, and
   wherein the steps of the image selection method are performed by a printer to select an image.

2. A non-transitory computer-readable storage medium storing program code that, when executed, causes a computer to select image data as an output target candidate among multiple image data, the program code comprising:
   a first program code for receiving input image data;
   a second program code for detecting a region in which a human face is captured from said input image data, and detecting face characteristics of the detected face region;
   a third program code for determining, based on the specification of said detected face region and a predetermined selection standard, said input image data is to be selected as said output image candidate; and
   a fourth program code for identifying a size and orientation of printing paper on which an image selected as said output target is to be output,
   wherein said input image data is selected, the size of said detected face region in which falls within a preset size range and the position of said detected face region in which falls within a preset position range, as an output target candidate by said third program code,
   wherein said size range and position range are set in accordance with the characteristics of the face captured in said image data and in accordance with said size and orientation of the printing paper on which said image data is to be output,
   wherein said third program code carries out said selection by applying said size range and said position range in accordance with said detected face characteristics, and by applying said size range and said position range in accordance with said size and orientation of the determined printing paper,
   wherein the characteristics of the faces captured in said image data include at least one of such characteristics as a number of faces captured, ages of the persons whose faces are captured, or genders of the persons whose faces are captured, and
   wherein said size range and said position range are sought statistically by displaying image groups comprising multiple photo subjects having different captured face sizes and positions and performing sense evaluation testing to select the preferred face sizes and positions, the sense evaluation testing including having test subjects select images with the face sizes and positions that the test subjects consider to be most appropriate for printing and creating a permittable range table defining the permittable ranges for the face sizes and positions.

3. A printer that selects image data as an output image candidate from among multiple image data, the printer comprising:
   an input unit that receives input image data;
   a face detection unit that detects from said input image data a region in which a human face is captured, and detects face characteristics of the detected face region;
   an output target selector that, based on the specification of said detected face region and a predetermined selection standard, determines said input image data is to be selected as said output image candidate; and
   an identifier that identifies a size and orientation of printing paper on which an image selected as said output target is to be output,
   wherein said input image data is selected, the size of said detected face region in which falls within a preset size range and the position of said detected face region in which falls within a preset position range, as an output target candidate by said output target selector,
   wherein said size range and position range are set in accordance with the characteristics of the face captured in said image data and in accordance with said size and orientation of the printing paper on which said image data is to be output,
   wherein said output target selector determines that said input image data is to be selected as said output target by applying said size range and said position range in accordance with said detected face characteristics, and by applying said size range and said position range in accordance with said size and orientation of the determined printing paper, wherein the characteristics of the faces captured in said image data include at least one of such characteristics as a number of faces captured, ages of the persons whose faces are captured, or genders of the persons whose faces are captured, and wherein said size range and said position range are sought statistically by displaying image groups comprising multiple photo subjects having different captured face sizes and positions and performing sense evaluation testing to select the preferred face sizes and positions, the sense evaluation testing including having test subjects select images with the face sizes and positions that the test subjects consider to be most appropriate for printing and creating a permittable range table defining the permittable ranges for the face sizes and positions.

\* \* \* \* \*